N. C. PHILLIPS.
PLUG FOR GLUE AND PASTE TUBES.
APPLICATION FILED MAY 12, 1914.

1,152,545.

Patented Sept. 7, 1915.

Witnesses:

Inventor:
Nathan C. Phillips
Atty's.

UNITED STATES PATENT OFFICE.

NATHAN C. PHILLIPS, OF GLOUCESTER, MASSACHUSETTS, ASSIGNOR TO RUSSIA CEMENT COMPANY, OF GLOUCESTER, MASSACHUSETTS, A CORPORATION OF MASSACHUSETTS.

PLUG FOR GLUE AND PASTE TUBES.

1,152,545.      Specification of Letters Patent.      Patented Sept. 7, 1915.

Application filed May 12, 1914. Serial No. 838,053.

*To all whom it may concern:*

Be it known that I, NATHAN C. PHILLIPS, a citizen of the United States, and resident of Gloucester, in the county of Essex and State of Massachusetts, have invented certain new and useful Improvements in Plugs for Glue and Paste Tubes, of which the following is a specification.

This invention is embodied in a glue-holding collapsible tube, and a plug adapted to close the neck or outlet of said tube, and provided with a spreader for distributing removed glue, and means for holding the smeared surface of the spreader out of contact with any horizontal surface on which the plug may be temporarily laid while glue is being forced from the tube, the said neck and plug being so formed that the neck is kept clean, or free from contact with adhesive material in the tube, so that the plug may be laid on a supporting surface without smearing the latter.

Figure 1:
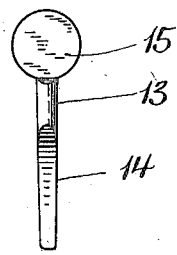
Figure 2:
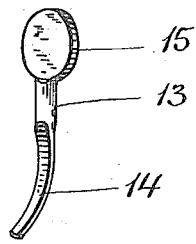
Figure 3:
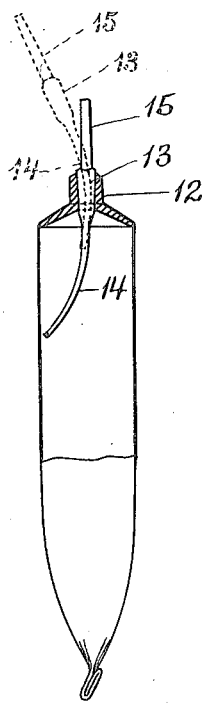
Figure 4:
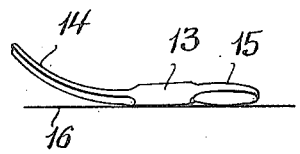

Of the accompanying drawings forming a part of this specification: Figure 1 represents a side view of the plug and spreader removed from the tube, the spreader being viewed sidewise; Fig. 2 represents a perspective view of the plug and spreader; Fig. 3 represents a sectional view of a collapsible tube and a side view of the device engaged therewith, the spreader being viewed edgewise; Fig. 4 represents a side view, and Fig. 5 an end view, showing the plug and spreader supported by a horizontal surface.

The same reference characters indicate the same or similar parts in all the views.

In the drawings, 12 represents the neck of a collapsible tube adapted to hold liquid glue, the neck having an elongated frusto-conical bore.

13 represents a correspondingly elongated frusto-conical plug formed to have a tight frictional fit in the bore of the neck 12. On the inner end of the plug is formed an elongated blade or spreader 14 which is curved or deflected so that it is wholly at one side of the axis of the plug, the form of the spreader being such that it is movable endwise in the neck 12, as indicated by full and dotted lines in Fig. 3. On the outer end of the plug is formed a handle 15, which projects from diametrically opposite sides of the plug. The handle, plug, and spreader are preferably made in a single integral piece, the preferred material being an alloy similar to that of which the tube and its neck are made.

Figure 5:
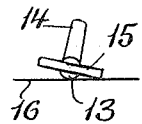

The relative arrangement of the plug, handle and spreader as indicated by Figs. 4 and 5 is such that when the plug is laid temporarily on a horizontal surface 16 with the spreader projecting upwardly, the handle will engage said surface, as indicated by Fig. 5, in such manner as to prevent the plug from rolling. The handle is weighted so that it overcomes the weight of the spreader and holds the latter elevated above the surface 16.

It will now be seen that the plug and spreader may be deposited on a table while glue is being forced from the tube, and that when the device is so deposited the spreader is held with its smeared surfaces out of contact with the table, so that there is no liability of transferring glue from the spreader to the table.

As shown by Fig. 3, the plug when inserted in the bore of the tube neck does not project below said neck, and is guarded by the neck against contact with adhesive material in the receptacle so that when the plug is removed and laid on its side, as shown by Fig. 4, its periphery is clean and does not smear said surface.

Having described my invention, I claim:

A combined plug and spreader formed of a single piece of material comprising a rounded body portion that tapers longitudinally and forms a sealing plug, the body portion terminating at one end in a flattened portion that is curved to form a spreading blade, the other portion of the body portion terminating in an enlarged flat widened portion that projects laterally beyond the sides of the body and blade and forms a weighted finger-grip.

In testimony whereof I have affixed my signature, in presence of two witnesses.

NATHAN C. PHILLIPS.

Witnesses:
     Jos. F. MACPHEE,
     WILLIAM O. PULSIFER.